US007709726B2

(12) United States Patent
Smith

(10) Patent No.: US 7,709,726 B2
(45) Date of Patent: May 4, 2010

(54) FOOT CONTROLLED EFFECTS KNOB AND RELATED METHODS

(76) Inventor: Chad C. Smith, 5402 Golden Pond Ave., Northport, AL (US) 35473

(*) Notice: Subject to any disclaimer, the term of this patent is extended or adjusted under 35 U.S.C. 154(b) by 160 days.

(21) Appl. No.: 11/939,351

(22) Filed: Nov. 13, 2007

(65) Prior Publication Data

US 2009/0056528 A1 Mar. 5, 2009

Related U.S. Application Data

(60) Provisional application No. 60/969,108, filed on Aug. 30, 2007.

(51) Int. Cl.
*G01P 3/00* (2006.01)
*G10H 1/02* (2006.01)

(52) U.S. Cl. ............................ 84/626; 84/662; 84/687; 84/701; 84/721; 84/746

(58) Field of Classification Search ...................... None
See application file for complete search history.

(56) References Cited

U.S. PATENT DOCUMENTS

| | | | | |
|---|---|---|---|---|
| 7,476,799 | B2 * | 1/2009 | Purchon et al. | 84/746 |
| 2006/0011052 | A1 * | 1/2006 | Purchon et al. | 84/746 |
| 2007/0176729 | A1 | 8/2007 | Ebrey | |
| 2007/0245886 | A1 * | 10/2007 | Adams et al. | 84/745 |
| 2008/0055241 | A1 * | 3/2008 | Goldenberg et al. | 345/156 |

* cited by examiner

*Primary Examiner*—Marlon T Fletcher
(74) *Attorney, Agent, or Firm*—Lathrop & Gage LLP

(57) ABSTRACT

A foot controlled effects knob controls a variable electronic component. A receptacle couples with a spindle of the variable electronic component. One or more wings extend from the receptacle to facilitate control of the spindle, and thus the variable electronic component, by a user's foot.

23 Claims, 6 Drawing Sheets

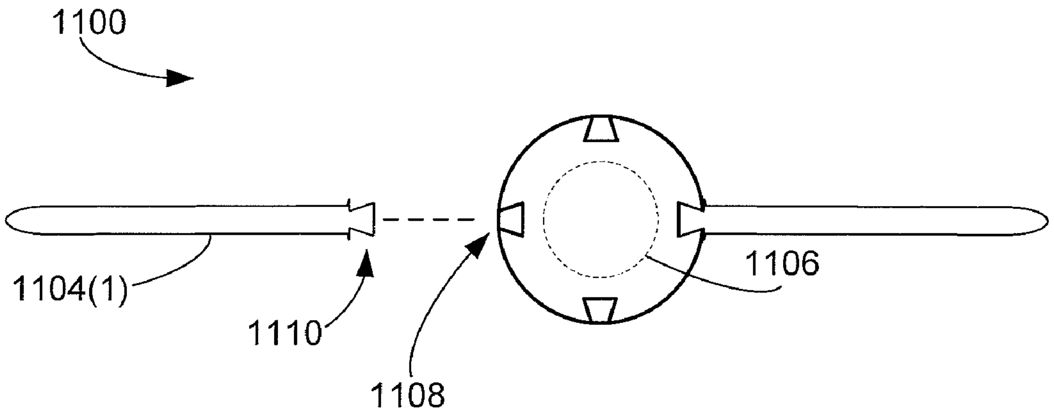
FIG. 11
FIG. 12A
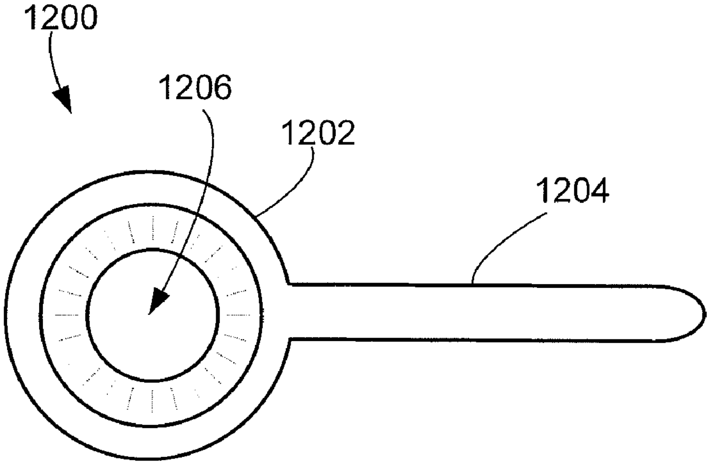
FIG. 12B
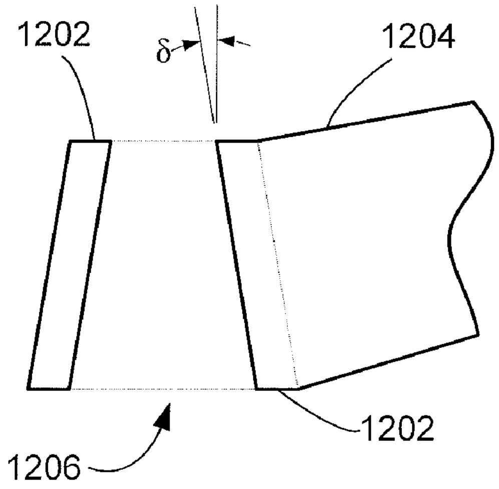

FOOT CONTROLLED EFFECTS KNOB AND RELATED METHODS

RELATED APPLICATIONS

This application claims priority to U.S. Provisional Application No. 60/969,108, entitled "The Option Knob is a customized knob (of any make up i.e. plastic, fiberglass, nylon, steel, etc.) that allows the user to replace a factory knob, which can only be altered by using their hands, with the new knob design which allows the user to alter the knob with their feet. Specifically designed to be used on effects pedals utilized in the music industry," filed on 30 Aug. 2007 and incorporated herein by reference.

BACKGROUND

Guitar players use effector pedals, also known as effects pedals, to produce sound effects such as delay, chorus, reverb and the like. The guitar connects to the effects pedal and then to an audio amplifier. The effects pedal has one or more control knobs disposed thereon for controlling and adjusting parameters of the sound effects. These control knobs are typically fitted to a spindle of a potentiometer during manufacture of the effects pedal and are finger (i.e., hand) operated. Thus, in order to control the sound effects of the effects pedal, guitar players must reach down (since the effects pedal is situated on the floor) and use their fingers to turn the control knobs, thereby releasing their fingers from the guitar.

A guitar player may adjust parameters of the sound effects at an interval during a live performance. However, the inability to adjust sound effect parameters during performance limits the usefulness of the effects pedal.

Some manufacturers have converted the effects pedal into an effects unit that is disposed inside the guitar. For example, in the 1970's, Saint Louis Music Company manufactured an electric guitar, called the Electra, including in-guitar effectors. The Electra included knobs and switches mounting on top of the guitar body to control the effects unit. Though the inclusion of an in-guitar effects unit improved the player's ability to make adjustments to the sound effects during a performance, the control knobs and switches on the front of the guitar body cluttered its appearance. To use the in-guitar effects unit, the player must still use their fingers to manipulate the knobs on the guitar, thereby releasing control of their instrument.

SUMMARY

In one embodiment, a foot controlled effects knob controls a variable electronic component. The foot controlled effects knob has a receptacle for coupling with a spindle of the variable electronic component and one or more wings extending from the receptacle to facilitate control of the spindle by an operator's foot.

In another embodiment, a method controls a variable electronic device. A key of a foot controlled effects knob is aligned with a key of a spindle of the variable electronic component. The foot controlled effects knob is coupled with the spindle, such that a foot may turn the foot controlled effects knob to control the variable electronic component.

In another embodiment, a collared wing controls a variable electronic component. The collared wing includes one or more wings and a collar attached to the one or more wings. The collar couples with a finger knob to facilitate control of the variable electronic component by a user's foot.

In another embodiment, a method uses a collared wing to control a variable electronic component. A collar of the collared wing is aligned with a finger knob which attaches to the variable electronic component. The collar is pushed onto the finger knob; and the wing attachment is used to control the existing factory-fitted knob, such that a foot may turn the wing attachment to control the variable electronic component.

BRIEF DESCRIPTION OF THE FIGURES

FIG. 11 shows an expanded top view of a foot controlled effects knob with a removable wing.

FIG. 12A shows a bottom isometric view of a collared wing that attaches to a factory-fitted finger knob (not shown) used to control a variable electronic component that forms part of a musical sound effects device.

FIG. 12B shows a cross-section through collared wing illustrating a tapered aperture that facilitates coupling of collared wing with the factory-fitted finger knob.

DETAILED DESCRIPTION OF THE FIGURES

Reference will now be made to the attached drawings, where multiple elements within the figure may not be labeled for the sake of clarity, and the figures may not be drawn to scale.

The present disclosure relates to foot controlled effects knobs and related methods that allow a variable electronic component to be controlled by foot.

Figure 1:
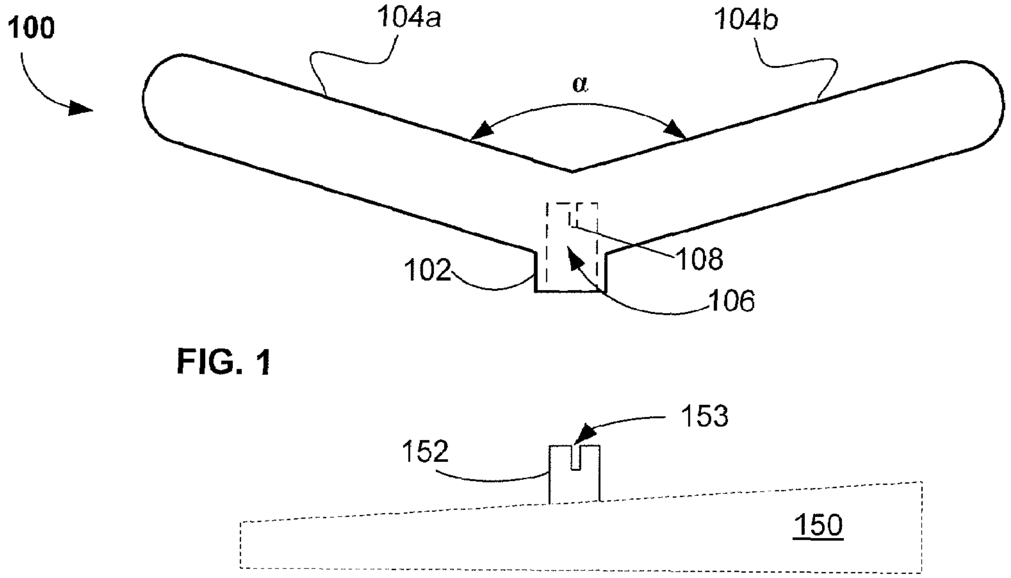
FIG. 1 shows a front view of a foot controlled effects knob with two wings, according to an embodiment.

FIG. 1 shows a front view of a foot controlled effects knob 100 with two wings 104. First and a second wing 104*a* and 104*b* attach to a receptacle 102 configured to attach to a spindle of a variable electronic component (e.g., a potentiometer of a musical effects device such as a guitar effect pedal). Wings 104*a* and 104*b* extend from opposite sides of receptacle 102 forming an angle α between wings 104. Angle α is preferably 90 degrees or greater so that wings may be individually contacted by a foot. Wings 104*a* and 104*b* facilitate foot control of foot controlled effects knob 100. For example, one wing 104 may be easily pushed by a user's foot, irrespective of the initial position of foot control knob 100. Receptacle 102 is designed to mate with a spindle of a variable electronic component, such as a potentiometer (variable resistance) or a variable capacitor.

In an example of operation, receptacle 102 of foot control knob 100 attaches to a spindle 152 of a potentiometer 150 that controls a sound effect of a guitar effects pedal 150. Foot control knob 100 allows a guitar player to adjust the controlled sound effects of guitar effects pedal 150 using one foot and while playing the guitar.

Although foot controlled effects knob 100 is shown with two wings 104, the foot control knob 100 may include one, three or more wings without departing from the scope hereof.

There are three common formats for variable electronic component spindles. A first format has a slot formed in the end of the spindle to mate with a matching key in a controlling knob. A second format has a spindle with a flat running the length of the spindle that mates with a flat key formed within the controlling knob. A third format is a cylindrical spindle, upon which a controlling knob with a fixing screw attaches, the screw functioning to key the controlling knob to the spindle. Foot control knob 100 is illustratively keyed to fit the slotted spindle format although it may be configured to fit with other formats (see, e.g., FIGS. 7 and 9).

Figure 2:
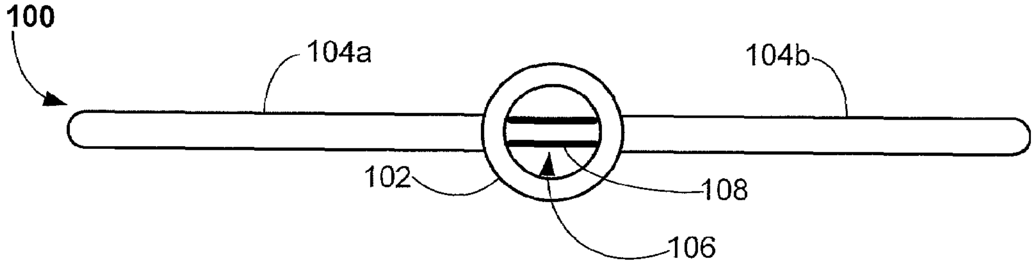
FIG. 2 shows a bottom view of the foot controlled effects knob of FIG. 1.
Figure 3:
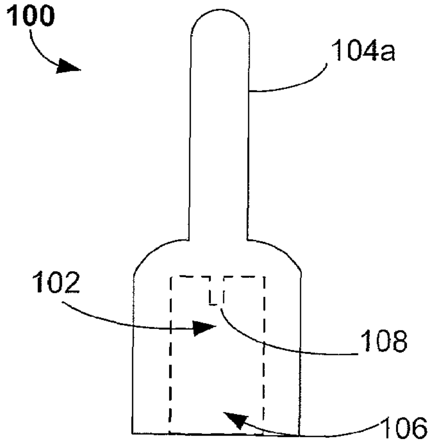
FIG. 3 shows a side view of the foot controlled effects knob of FIG. 1.

In particular, FIGS. 2 and 3 show a bottom view and a side view of foot control knob 100, FIG. 1, respectively. FIGS. 1, 2 and 3 are best viewed together with the following description. Receptacle 102 is formed with a cylindrical channel 106 to accommodate insertion of spindle 152. A key 108 is disposed within channel 106 to mate with slot 153 of spindle 152. Key 108 operates to prevent foot control knob 100 from slipping on spindle 152 during operation.

Figure 4:
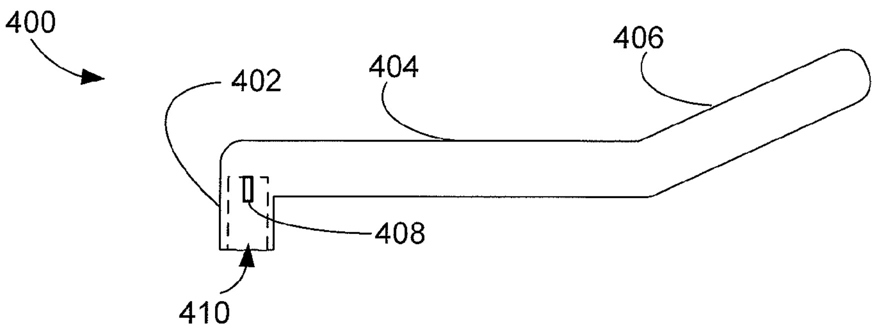
FIG. 4 shows a front view of a foot controlled effects knob with a single wing, according to an embodiment.

FIG. 4 shows an exemplary side view of a foot controlled effects knob 400 with a single wing 406 connected to a receptacle 402 by a substantially horizontal arm 404. Receptacle 402 is formed with a channel 410 and a key 408 for coupling with a spindle (e.g., spindle 152 of FIG. 1).

Figure 5:
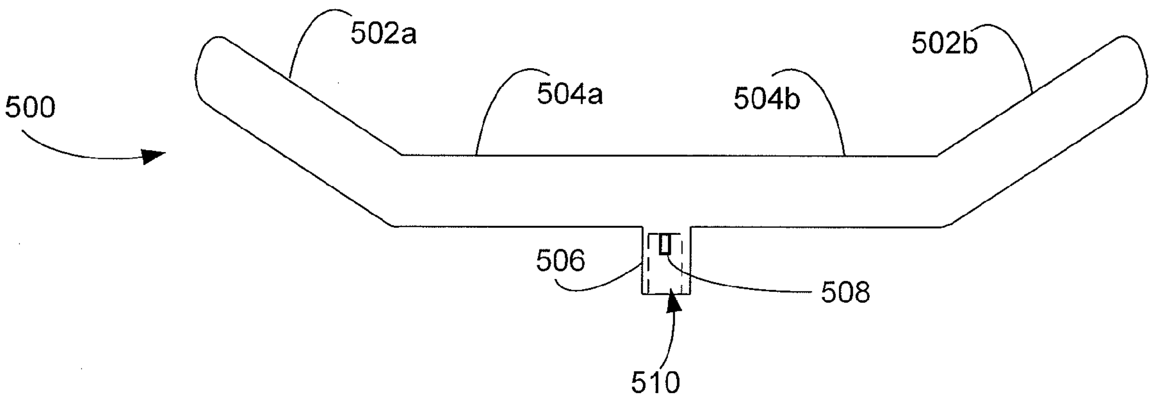
FIG. 5 shows a front view of a foot controlled effects knob with two extended wings, according to an embodiment.

FIG. 5 shows an exemplary side view of a foot controlled effects knob 500 with two extended wings 502 that connect to a receptacle 506 by two substantially horizontal arms 504. Receptacle 506 is similar to receptacle 402 of FIG. 4, and is formed with a channel 510 configured with a key 508 for mating with a spindle (e.g., spindle 152, FIG. 1).

In an embodiment, wings, horizontal arms, and receptacles may be detachable so that foot control knob 500 is configurable for optimal foot control. For example, these components may vary in length and/or size for selectively coupling to meet the requirements of a particular installation. In another embodiment, wings may be hinged to a horizontal arm to allow folding of the hinged for efficient transport and packaging.

Any of wings 104, 406 and 502, and arms 404 and 504 of foot control knobs 100, 400 and 500, FIGS. 1, 4 and 5, respectively, may include grips fabricated from metal, plastic, or rubber that are textured to provide increased traction. The double arm configuration of knob 500 may facilitate bidirectional control as compared to knob 400 having a single horizontal arm.

Figure 6:
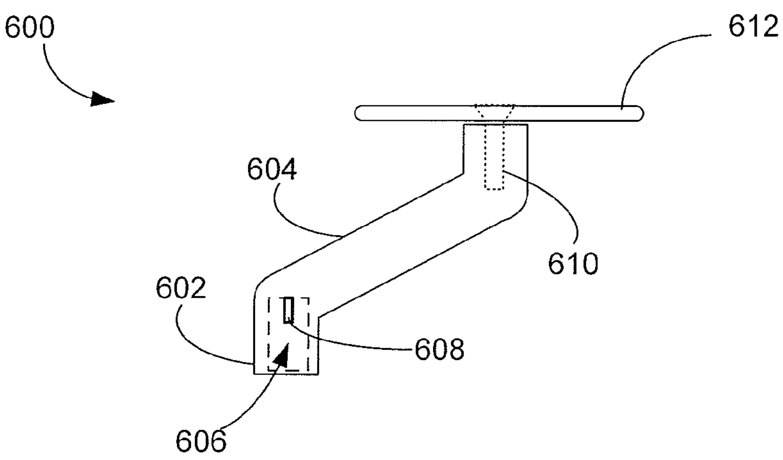
FIG. 6 shows a front view of a foot controlled effects knob having one extended wing with a pivoted plate, according to an embodiment.

FIG. 6 shows a front view of a foot controlled effects knob 600 having a receptacle 602, an extended wing 604 and a pivoted plate 612. Receptacle 602 connects to a first end of extended wing 604, and pivoted plate 612 connects to the other end of extended wing 604 by a pivot 610 such that pivoted plate 612 may rotate freely about pivot 610. Plate 612 serves as a rest for a user's foot while controlling foot controlled effects knob 600. Receptacle 506 is similar to receptacle 402 of FIG. 4, and is formed with a channel 606 configured with a key 608 for mating with a spindle (e.g., spindle 152, FIG. 1).

Figure 7:
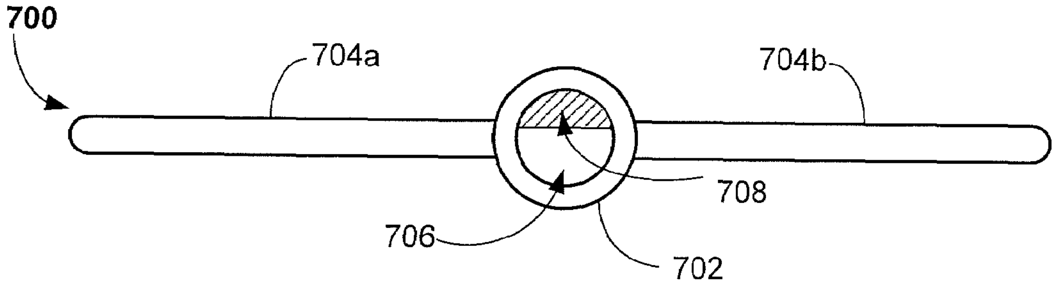
FIG. 7 shows a bottom view of a foot controlled effects knob configured to attach to a spindle with a flat key, according to an embodiment.

FIG. 7 shows a bottom view of an exemplary foot controlled effects knob 700 configured to attach to a spindle with a flat key format. Foot controlled effects knob 700 has wings **704*a* and 704*b* that extend from a receptacle 702 formed with a channel 706 that couples to a spindle (e.g., spindle 152, FIG. 1). In particular, channel 706 includes a flat key 708 that matches the flat key of the spindle, thereby preventing foot control knob 700** from slipping (spinning) on the spindle.

In an embodiment, key 708 if formed of one or more spring plates that are inserted into channel 706 to secure foot controlled effects knob 600 to the spindle.

Figure 8:
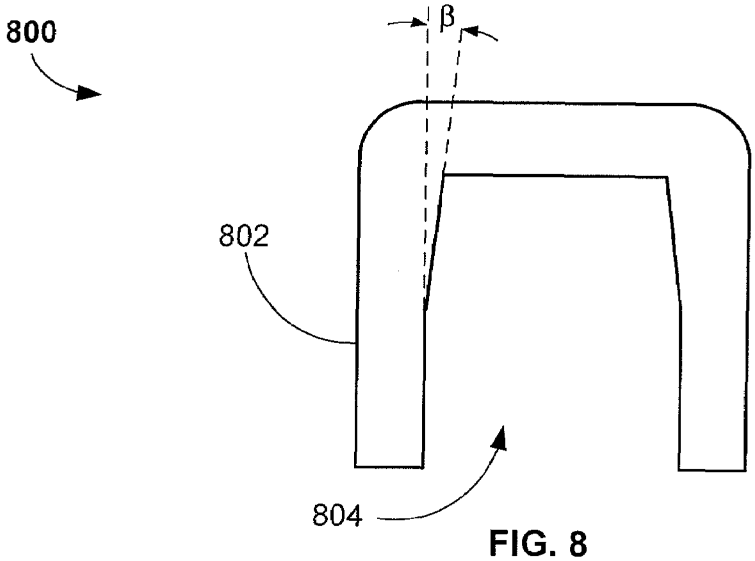
FIG. 8 shows a cross-sectional view of a foot control knob receptacle with a tapered channel for attaching to a spindle, according to an embodiment.

FIG. 8 shows a cross-sectional view 800 of a foot controlled effects knob receptacle 802 with a tapered channel 804. Channel 804 is substantially cylindrical with a top portion (e.g., the top half of channel 804) having a taper of β, such that receptacle 802 may couple by friction fit to many spindles. For example, receptacle 802 may couple to spindle 152, FIG. 1, by a press fit. Angle β is small, for example between 0 and 5 degrees. Receptacle 802 may be formed with any of foot control knobs 100, 400, 500, 600 and 700 of FIGS. 1, 4, 5, 6 and 7, respectively, to provide an alternate method of securing the foot controlled effects knob to the spindle.

Figure 9:
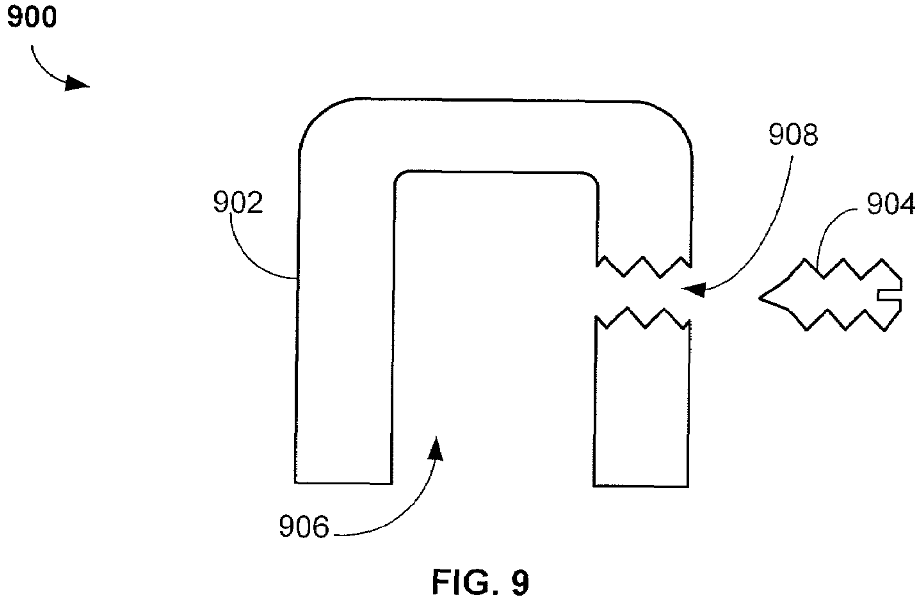
FIG. 9 shows a cross-sectional view of a foot control knob receptacle with a securing screw, according to an embodiment.

FIG. 9 shows a cross-sectional view 900 of a foot controlled effects knob receptacle 902 with a securing screw. Receptacle 902 is formed with a substantially cylindrical channel 906 that accommodates insertion of a spindle. On one side of receptacle 902 is located a threaded hole 908 into which a grub screw 904 is screwed to secure the spindle once inserted into channel 902. Receptacle 902 may be formed with any of foot control knobs 100, 400, 500, 600 and 700 of FIGS. 1, 4, 5, 6 and 7, respectively, to provide an alternate method of securing the foot controlled effects knob to the spindle.

The above-described foot controlled effects knobs 100, 400, 500, 600 and 700 may be fabricated from one or more materials selected from metals, metal alloys (e.g., stainless steel), plastics, rubber, carbon fiber, fiberglass, wood, ceramics and combinations thereof. Foot control knobs 100, 400, 500, 600 and 700 may be conveniently produced by injection molding.

Figure 10:
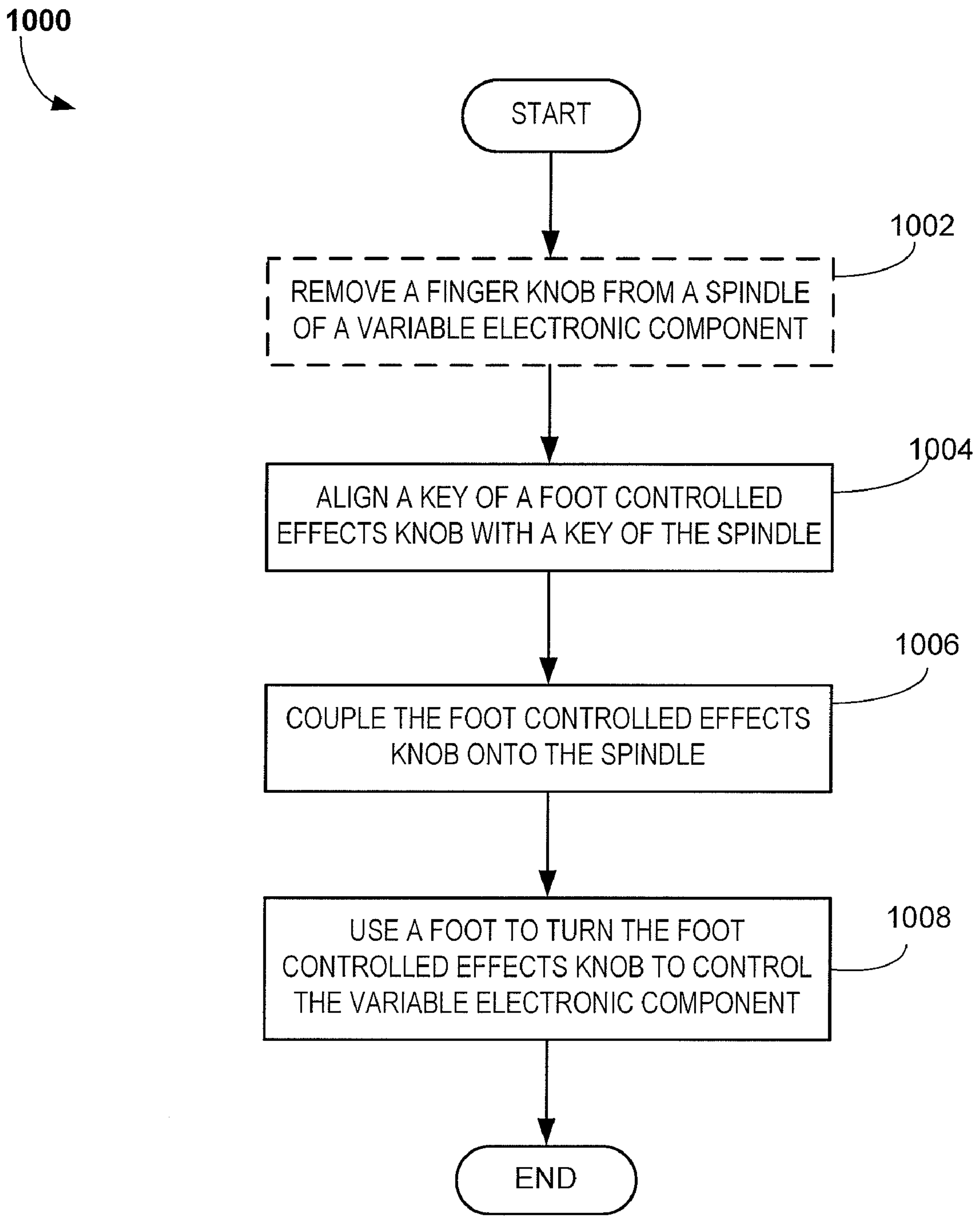
FIG. 10 shows an exemplary method for utilizing a foot controlled effects knob.

FIG. 10 shows one exemplary method 1000 for using a foot controlled effects knob 100 to control a variable electronic component. As previously disclosed, the variable electronic component may represent one of a potentiometer, a variable capacitor, or other such controllable electronic component, of a musical sound effects device (e.g., a guitar effects pedal).

Step 1002 is optional, depending whether a finger knob is fitted to the variable electronic component. In step 1002, method 1000 removes a finger knob from a spindle of the variable electronic component. In one example of step 1002, a factory-fitted finger knob is removed from spindle 152 of guitar effects pedal 150, FIG. 1. In step 1004, method 1000 aligns a key of the foot controlled effects knob with a key of the spindle. In one example of step 1006, key 108 of foot controlled effects knob 100 is aligned with slot 153 of spindle 152. In step 1006, method 1000 couples (e.g., pushes) the foot controlled effects knob onto the spindle. In one example of step 1006, foot controlled effects knob 100 is pushed onto spindle 152. In step 1008, a foot turns the foot controlled effects knob to control the electronic device. In one example of step 1008, a guitar player uses a foot to push one of wings 104 of foot controlled effects knob 100 to turn spindle 152 and adjust sound effects of guitar effects pedal 150.

FIG. 11 shows an expanded top view of a foot controlled effects knob 1100 with a removable wing 1104. A receptacle 1102 has at least one keyed slot 1108 formed to receive a keyed end 1110 of removable wing 1104. For example, keyed end 1110 of removable wing 1104 may slide vertically into slot 1108 to form a secure friction fit. Receptacle 1102 includes a cylindrical channel 1106 that couples to a spindle (e.g., spindle 152, FIG. 1). Receptacle 1102 is shown with four slots 1108, although receptacle 1102 may include more or fewer slots 1108 without departing from the scope hereof.

Once coupled with receptacle 1102, removable wing 1104 facilitates foot control of foot control knob 1100. Foot controlled effects knobs 1100 components may be fabricated from one or more materials selected from metals, metal alloys (e.g., stainless steel), plastics, rubber, carbon fiber, fiberglass, wood, ceramics and combinations thereof. Wing 1104 and receptacle 1102 may be conveniently produced separately by injection molding. Removable wing 1104 and slotted receptacle 1102 may facilitate packaging of foot controlled knob 1100.

FIG. 12A shows a bottom isometric view of a collared wing 1200 that attaches to a factory-fitted finger knob (not shown) used to control a variable electronic component that forms part of a musical sound effects device. Collared wing 1200 is formed with a round collar 1202 and an attached wing 1204. FIG. 12B shows a cross-section through collared wing 1200 illustrating a tapered aperture 1206 that facilitates coupling of collared wing 1200 with the factory-fitted finger knob. FIGS. 12A and 12B are best viewed together with the following description. Although shown with a single wing 1204, collared wing 1200 may include additional wings positioned around collar 1202 without departing from the scope hereof.

Collared wing 1200 couples with the factory-fitted finger knob by a press fit. That is, collar 1202 is pushed over the finger knob and remains in place by virtue of a friction fit between tapered aperture 1206 and the finger knob. Tapered aperture 1206 has a taper angle $\delta$ such that collar 1202 fits many factory-fitted finger knobs. In one embodiment, collar 1202 is elastic to allow collared wing 1200 to attach to finger knobs of various sizes and shapes. For example, angle $\delta$ is between 0 and 5 degrees. Once coupled with the factory-fitted finger knob, collared wing 1200 facilitates control of the finger knob (and hence the variable electronic component connected to the factory-fitted finger knob) by foot. That is, the user may use a foot to manipulate wing 1204 to control sound effects of the musical sound effects device.

Collared wing 1200 may be fabricated from one or more materials selected from metals, metal alloys (e.g., stainless steel), plastics, rubber, carbon fiber, fiberglass, wood, ceramics and combinations thereof. Collared wing 1200 may be produced by injection molding.

Figure 13:
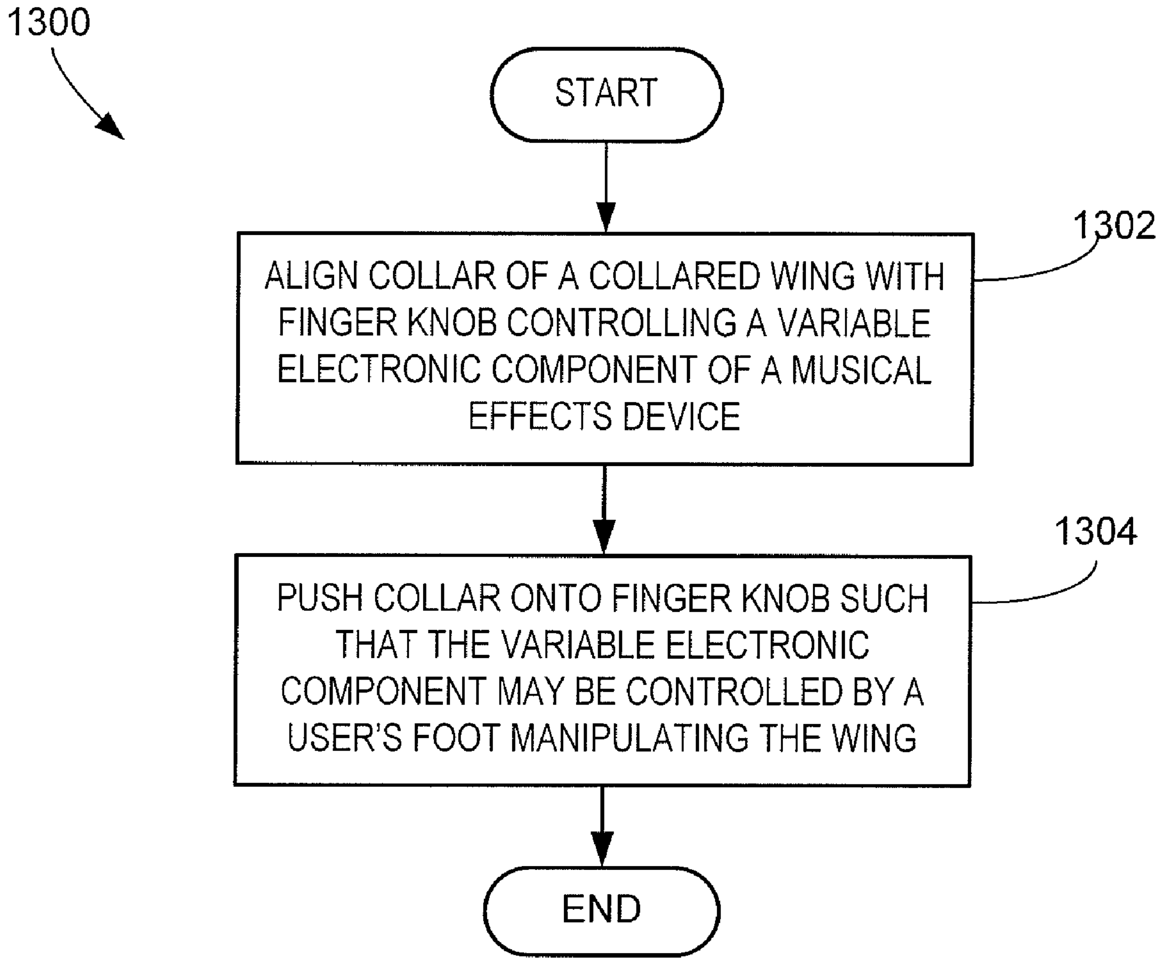
FIG. 13 shows one exemplary method for using collared wing of FIG. 12A to control a variable electronic component of a musical effects device.

FIG. 13 shows one exemplary method 1300 for using collared wing 1200 of FIG. 12A to control a variable electronic component of a musical effects device. In step 1302, method 1300 aligns collar 1202 of collared wing 1200 with an existing finger knob that controls a variable electronic component of the musical effects device. For example, collar 1202 aligns with a factory-fitted finger knob of spindle 152, of FIG. 1. That is, when using collared wing 1200 it is not necessary to remove the finger knob from the spindle. In step 1304, method 1300 pushes collar 1202 onto the finger knob such that the variable electronic components may be controlled by a user's foot manipulating the wing.

Changes may be made in the above methods and system without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present methods and systems, which, as a matter of language, might be said to fall there between.

What is claimed is:

1. A foot controlled effects knob for controlling a variable electronic component, comprising:

a receptacle for coupling with a spindle of the variable electronic component; and one or more wings extending from the receptacle, the one or more wings configured for actuation by a user's foot:

wherein rotation of one wing by the user's foot rotates the spindle, to facilitate control of the variable electronic component by the user's foot.

2. The foot controlled effects knob of claim 1, the foot controlled effects knob having two horizontally opposed wings.

3. The foot controlled effects knob of claim 1, further comprising a pivoted plate attached to the wing and opposed to the receptacle.

4. The foot controlled effects knob of claim 1, wherein the one or more wings comprises two wings that are separated from one another at an angle, $\alpha$, wherein the angle $\alpha$ is at least 90 degrees.

5. The foot controlled effects knob of claim 1, further comprising a key, located within the receptacle, for mating with a key of the spindle, the key operable to prevent the foot controlled effects knob from slipping (spinning) on the spindle.

6. The foot controlled effects knob of claim 5, the key within the receptacle comprising a blade for mating with a slot in the spindle.

7. The foot controlled effects knob of claim 5, the key within the receptacle comprising a flat for mating with a flat formed on the spindle.

8. The foot controlled effects knob of claim 1, the knob being coupled with the spindle by friction.

9. The foot controlled effects knob of claim 1, the receptacle having a threaded hole and a grub screw for securing the foot controlled effects knob to the spindle.

10. The foot controlled effects knob of claim 1, wherein the foot controlled effects knob is fabricated from one or more of metal, metal alloy, plastic, rubber, carbon fiber, fiberglass, wood, and ceramic.

11. The foot controlled effects knob of claim 1, the foot controlled effects knob being fabricated by injection molding.

12. The foot controlled effects knob of claim 1, the variable electronic component controlling a sound effect of a guitar effects pedal.

13. The foot controlled effects knob of claim 1, the variable electronic component forming part of an effects device.

14. The foot controlled effects knob of claim 1, the one or more wings having a keyed end for attaching to a keyed slot within the receptacle.

15. A method for using a foot controlled effects knob to control a variable electronic component, comprising:

aligning a key of the foot controlled effects knob with a key of a spindle of the variable electronic component; and coupling the foot controlled effects knob with the spindle, such that a foot may turn the foot controlled effects knob to turn the spindle and thus control the variable electronic component.

16. The method of claim 15, further comprising removing a finger knob from the spindle of the variable electronic component.

17. The method of claim 15, the step of coupling comprising pushing the foot controlled effects knob onto the spindle.

18. The method of claim 15, the step of coupling comprising securing the foot controlled effects knob to the spindle using a grub screw.

19. A collared wing for controlling a variable electronic component, the collared wing comprising:

one or more wings; and a collar attached to the one or more wings, the collar coupling with a finger knob to facilitate control of the variable electronic component by a user's foot;

wherein rotating the collar via foot pressure to the one or more wings rotates the finger knob, to control the variable electronic component.

20. The collared wing of claim 19, the collar having a taper for attaching to the finger knob.

21. The collared wing of claim 19, the collar being elastic to attach to the finger knob when the finger knob has a larger external diameter than the internal diameter of the collar.

22. The wing attachment of claim 19, further comprising fabricating the collared wing by injection molding.

23. A method for using a collared wing to control a variable electronic component, comprising:

aligning a collar of the collared wing with a finger knob attached to the variable electronic component;

pushing the collar onto the finger knob; and turning the wing attachment on the existing factory-fitted knob, such that a foot may turn the wing attachment to turn the finger knob and control the variable electronic component.

* * * * *